Oct. 27, 1964    J. BRAYMAN ETAL    3,154,619
GASKET FORMING TECHNIQUE IN PRESSURE-MULTIPLYING APPARATUS
Filed Nov. 26, 1962    2 Sheets-Sheet 1

INVENTORS.
JACOB BRAYMAN &
MARTIN A. GABEY
BY
their    ATTORNEYS.

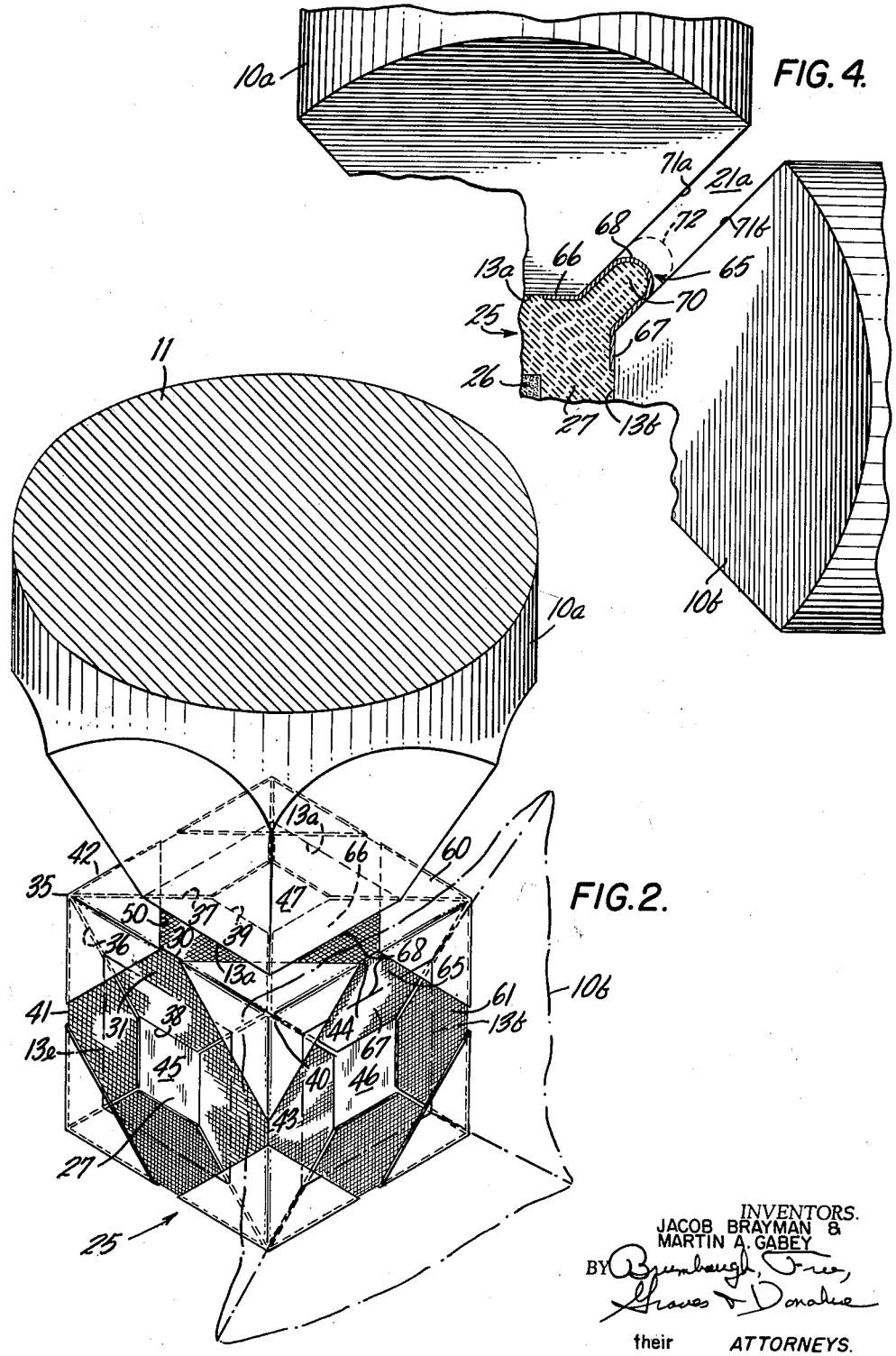

United States Patent Office 3,154,619
Patented Oct. 27, 1964

3,154,619
GASKET FORMING TECHNIQUE IN PRESSURE-MULTIPLYING APPARATUS
Jacob Brayman, Staten Island, N.Y., and Martin A. Gabey, Bergenfield, N.J., assignors to Barogenics, Inc., New York, N.Y., a corporation of New York
Filed Nov. 26, 1962, Ser. No. 240,049
6 Claims. (Cl. 264—319)

This invention relates generally to the pressure generating technique wherein pressure-multiplying anvils with inter-anvil gaps therebetween are arrayed around a work assembly comprised of an object to be compressed and of a casing of pressure-transmissive material around such object, and wherein the anvils apply pressure to the casing to produce both a communication of such pressure through the casing to the object and an extrusion of casing material into the inter-anvil gaps to there form gaskets which seal in the pressure so being communicated. More particularly, this invention relates to methods and means for improving the forming of such gaskets.

The previous practice has been to form the mentioned gaskets by means of an unimpeded extrusion of the casing material into the inter-anvil gaps to there form bulges or "embryo" gaskets. Initially, however, the casing material in the embryo gaskets or bulges in those gaps is under insufficient pressure from the anvil sides by which those gaps are bordered to become plastic and have good internal coherence. The result is that, initially, the extruded casing material separates from the main body of the casing to form chips or pieces which fall away. Since such fallen away material is useless for gasket purposes, the extrusion must be continued until the extruded material holds in place. In other words, the anvils must be driven further inwardly to reduce the width of the inter-anvil gaps and to simultaneously produce steady extrusion of more material into the shrinking gaps until those gaps have been narrowed to the point where the gasket bulges receive sufficient support and pressure from the anvil sides to not break off from the casing proper.

Such inability of the prior practice to form effective gaskets until after the inter-anvil gaps have become quite narrow gives rise to the following disadvantage.

The pressure which may be employed to actuate the pressure-multiplying anvils has a limit determined by the maximum stress the anvils are capable of sustaining without breakage. Assuming that the anvils are initially in contact with the casing and are then loaded by application to their faces of actuating pressure which builds up to and stops at such limiting value, each anvil responds to the driving pressure thereon by undergoing a forward stroke which continues until the anvil stops because the force from the casing and gaskets which opposes the stroke has become equal to the driving force produced on the anvil by the maximum actuating pressure. At this point, the anvils are exerting on the casing material a maximum load of which a first fraction is transferred to the main body of the casing to the end of compressing the central object, and of which a second fraction is absorbed by the gaskets which have formed in the inter-anvil gaps.

For a casing of a given initial configuration and size and for a given set of anvils exerting pressure on that casing in the manner described, the fraction of the anvil load absorbed by the gaskets depends on the width which the inter-anvil gaps have during the time the anvils are compressing gaskets formed therein. If those gaps are then relatively wide so as to contain relatively thick gaskets which are compressed by the anvils until they stop, those thick gaskets yield relatively easily to the anvils so as, thereby, to absorb a relatively small fraction of the total anvil load. If, on the other hand, those gaps are then relatively narrow so as to contain thin gaskets, such thin gaskets are relatively resistant to anvil movement so as, thereby, to increase the gasket-absorbed fraction of the anvil load at the expense of the fraction of load transferred to the casing proper and available for compressing the central object.

Hence, because the described prior art practice was unable to effect gasket formation until the inter-anvil gaps had narrowed down considerably, such practice resulted in a relatively low fraction of the total anvil load being available for compressing the central body, i.e.—resulted in a relatively low efficiency of performance of the pressure-multiplying anvils.

In connection with the above, it is to be pointed out that the absorption by the gaskets of some of the anvil load is, within limits, desirable because such absorption results in lateral support by the gaskets of the anvils to thereby permit the anvils to operate with much higher internal stresses than would be tolerable in the absence of such lateral support. The prior art gasket-forming practice resulted, however, in a delaying of the creation of effective gaskets until after the inter-anvil gaps had been so far narrowed down and the gaskets formed therein so thin that those gaskets absorbed a much greater fraction of the anvil load than that which was necessary to provide safe lateral support.

It is, accordingly, an object of this invention to provide for the creation of dynamically formed gasket in a manner obtaining transfer of a greater fraction of the anvil load to the object being compressed than that obtained according to the described previous practice of dynamically forming gaskets.

Another object of the invention is to prevent excessive loss of casing material in the course of the creation of dynamically formed gaskets.

Still another object of our invention is to permit by virtue of improved gasket forming the use of larger work assemblies with arrays of pressure-multiplying anvils of a given size.

These and other objects are realized according to our invention by employing flexible stretchable sheet material in such manner that, when a working assembly comprised of a central body to be compressed and a casing of pressure-transmissive material around that body is subjected to pressure by an array of pressure-multiplying anvils separated by inter-anvil gaps, the sheet material forms flexible stretchable diaphragms which extend across the inward ends of the gaps to restrain at least temporarily the separation from the main body of the casing of that part of the casing material which is forced into the gaps by the anvil pressure on the casing.

Such sheet material may be carried by the casing prior to a compressing operation. Alternatively, the sheet material may be loose from the casing but may be inserted prior to a compressing operation between the anvils and the casing so as to form the mentioned diaphragms across the inter-anvil gaps. While the sheet material should have a positioning and distribution which enables the material to form the mentioned diaphragms, any distribution of material which satsfies this criterion is satisfactory so that, for example, the material may be either in the form of suitably positioned and proportioned strips or in the form of a continuous envelope completely enclosing the casing.

The use of such sheet material to provide the described restraining diaphragms is not limited to any particular exterior configuration for the casing. Thus, for example, such sheet material may be used when the casing configuration is spherical (has neither edges nor vertices) as disclosed in U.S. Patent 3,044,113 or is cylindrical (has edges but not vertices) as described in that patent or, alternatively, is characterized by one of the polyhedral shapes (i.e., has both edges or vertices) which are described in U.S. Patent 2,968,837. For any of such casing configurations, what is contemplated by the invention is that the sheet material (whether in the form of a complete envelope or of strips) will be operably disposed (for the purpose of forming the mentioned diaphragms) over at least those elongated surface portions of the casing which intersect with each other to form a cage-shaped grid work corresponding to but wider in its sections than the pattern of the inner end openings of the inter-anvil gaps as projected onto the casing.

As compared to the arrangement described in U.S. Patent 2,947,034 to Wentorf wherein the extrusion of casing material into the gaps is altogether prevented by a structure formed of rigid dam members positioned about the casing to be interposed between it and the gaps, the use according to this invention of a structure of flexible stretchable sheet material to restrain but not prevent such extrusion is advantageous because of the extreme simplicity of the sheet material structure and, consequently, the low cost and ease of making of the restraining structure. Furthermore, since the mentioned dam members occupy a substantial part of the space enclosed by the anvils whereas the sheet material structure of the invention occupies only a negligible part of such space, the invention permits both the pressure-transmissive casing contained in that space and the central body in the casing to be of maximum size to thereby increase the amount of material within the central body which can be compressed by a given configuration of anvils enclosing a given size space.

For a better understanding of the invention, reference is made to the following description of a representative embodiment thereof and to the accompanying drawings wherein:

FIG. 2 is an isometric view of part of the apparatus of FIG. 1;

FIG. 4 is a broken-away schematic plan view of (partly in cross section) the apparatus of FIG. 1 at an initial stage in the formation of the gaskets provided by the casing material of the mentioned work assembly.

Figure 1:
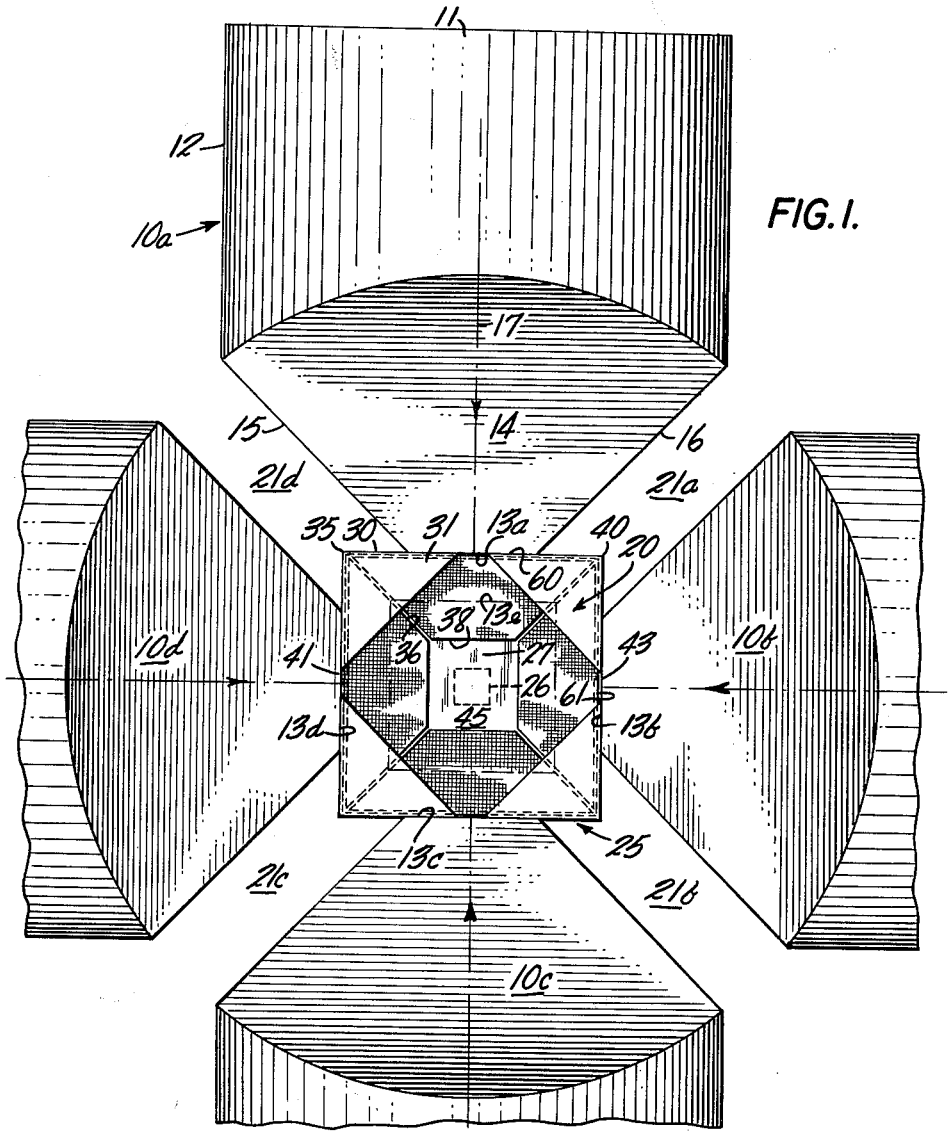
FIGURE 1 is a schematic plan view of a pressure-multiplying apparatus containing a work assembly according to the invention.

Referring now to FIG. 1, the reference numeral 10a designates a schematically shown pressure-multiplying anvil having a rear face 11 a cylindrical shank 12 and a front end which tapers down to a square front face 13a smaller in area than the rear face 11. The anvil 10 is rendered forwardly tapered by four beveled faces of which a first face 14 is shown in full view, another two beveled faces 15 and 16 are shown edge-on, and the remaining beveled face is directly beneath and is hidden by the face 14. Those four beveled faces are identical in shape and size and are disposed at 90° intervals around the centerline of action 17 of the anvil to render the front part thereof in the form of a truncated pyramid of square cross section normal to line 17.

The anvil 10a is one of six anvils arrayed in a cubic configuration around a central space or cavity 20 so that the square front faces of the anvils define around that space a cubic enclosure which is open at its edge and vertex regions. Of those six anvils, FIG. 1 shows not only anvil 10a but also three other anvils 10b, 10c, and 10d which are like 10a in that their centerlines of action lie in the plane of the drawing, and in that they have respective square front faces 13b, 13c and 13d of which each borders a separate side of the cavity 20. A fifth anvil has a centerline of action above and normal to the plane of the drawing, such fifth anvil not being represented in FIG. 1 except for its square front face 13e which is shown in dotted outline. The sixth anvil is disposed directly opposite the fifth one and is not shown at all in FIG. 1. All six of the anvils are separated from each other by inter-anvil gaps of which the gaps 21a, 21b, 21c and 21d are shown.

Since all six of the anvils are substantially identical, the previous description of anvil 10a, is readily applicable to the other five anvils which, accordingly, will not be separately described in detail herein.

In operation, the six anvils may be simultaneously driven inwardly along their respective centerlines of action by, say, six separate hydraulic rams mounted within, say, a cubic hinged frame as taught in the U.S. Patent 2,968,837 issued January 24, 1961 to Zeitlin et al. for "Super-High Pressure Apparatus." Such rams and frame are not part of the present invention and, therefore, are not shown in FIG. 1.

The six anvils act upon a work assembly 25 disposed in cavity 20 and comprised of a central body 26 to be compressed and of a cubic casing 27 around the body 26. The mentioned body may be, say, a mechanical part, a powdered chemical composition, a charge for making synthetic diamonds etc. and the body may be embedded in the casing in association with additional elements (not shown) of, for example, a sample container tube, electrothermal means for heating the body and so forth. The casing 27 is formed of a pressure-transmissive material which most commonly is pyrophyllite, but which also may be talc, brass or some other suitable substance.

Referring now both to FIG. 1 and FIG. 2, the edge 30 of casing 27 is covered by a strip 31 of flexible stretchable sheet material such as adhesive tape, ordinary cotton tape, duck material, nylon, teflon, cloth, paper, etc. While there is no objection to using material such as rubber tape which is resilient and highly stretchable, the material need neither be resilient nor stretchable without breaking for several times its own length. Instead, the material is satisfactorily stretchable when (to give an exemplary rather than a critical figure) the material can stretch for 25% of its own length without rupture.

We have found, in this connection that good result are obtained by using ordinary medical adhesive tape a the flexible stretchable material of which the strip 31 is made. An advantage of using medical adhesive tape or some other type of adhesive material is that it permits the material to be deposited on the exterior of the casing in the form of strips of which there is one per edge, and which lie flatly on the casing and adhere in place when once deposited. If desired, however, the material may be non-adhering (e.g., ordinary cotton tape) and may be deposited on the casing by, say, winding a ribbon of the material under tension around the four edges of each face of the casing and relying on the tension of the ribbon to keep the material in place on the casing.

As best shown by FIG. 2, the strip 31 is cut to have a triangular left hand end formed by the meeting at a point 35 (on the centerline of the strip) of two equal length margins 36 and 37 running diagonally between that point and, respectively, the margins 38 and 39 which are the uncut side margins of strip 31. Rightwardly, the strip 31 has a similar triangular end coming to a point 40. As shown, the point 35 is disposed at the vertex of casing 27 where the edge 30 of the casing meets two other edges 41, 42, whereas the right hand end point 40 of strip 31 is disposed at the casing vertex where edge 30 meets two other casing edges 43 and 44.

Each of the edges of casing 27 other than edge 30 is covered by a strip of flexible stretchable material identical in character with the strip 31 which covers edge 30. In each of the strips, the diagonal margins at the ends thereof are so cut that those margins of that strip are substantially contiguous on casing 27 with corresponding diagonal margins of other strips extending to the same vertices on the casing as the strip in question. Thus, save for unavoidable cracks due to imperfect closing together of registering diagonal margins on adjacent strips, the edge and vertex regions of the casing 27 are completely covered so as to leave exposed only those small square areas of the casing exterior which are at the centers of the square outside faces thereof. Three of such areas are shown in FIG. 2 and are designated as 45, 46 and 47. If desired, the mentioned strips of material which cover the casing may be made sufficiently wide to eliminate completely the areas wherein the casing remains exposed. In other words, the flexible stretchable sheet material may form a complete envelope around the casing.

While each vertex region of the casing 27 is covered by a coming together in that region of three of the described strips, the covering over the vertex lacks strength because each of the three strips terminates at the vertex point. Therefore, it is preferable for the strips on casing 27 to be reinforced at the vertices of the casing by the corner caps which are shown in FIG. 2, and of which the cap 50 is exemplary of and is identical with all the rest of the caps.

Figure 3:
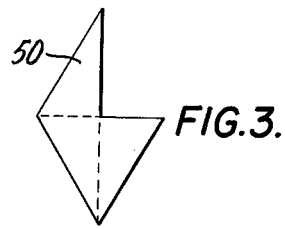
FIG. 3 is a developed view of one of the corner caps on the work assembly shown in FIGS. 1 and 2.

As illustrated by the FIG. 3 developed view, the cap 50 may be formed by taking a square of adhesive tape, cutting along the diagonals of the square to the center thereof so as to remove a triangle from the square, and folding the remaining piece of material into the shape of a three sided pyramid which is then fitted at a vertex of casing over the portions in the region of that vertex of the three already-deposited strips which come together at that vertex. While one of the edges of such pyramid will be an open edge, any weakness for reinforcing purposes introduced into the pyramidal cap by that open edge can be compensated for by using at each casing vertex a pair of caps of which one is fitted over the other and is rotated with respect to the other so that the open edges of the two caps do not coincide. As shown (FIG. 2) each corner cap should be of such size that a separate portion thereof is operably pinched between casing 27 and each of the three anvils adjacent the casing vertex over which the cap is fitted.

Prior to a compressing operation, the work assembly 25 is positioned relative to the surrounding cubic array of anvils such that each of the six square outside faces of the cubic casing 27 is contacted by the centered square front face of a respective one of the six anvils in the array. In order that the anvils may have the mentioned inter-anvil gaps therebetween, the square front face of each anvil is of smaller size than the full face of the casing 27 contacted by that anvil. Thus, for example, as best shown by FIG. 2, the anvil edges which bound the front face 13a of anvil 10a are spaced inwardly of the edges bounding that full face 60 of casing 27 which registers with the anvil face 13a. Likewise, the anvil edges which bound the front face 13b of anvil 10b are spaced inwardly of the edges bounding that full face 61 of casing 27 which registers with such anvil face 13b.

In this connection, the strip 65 of sheet material which covers casing edge 44 is a strip which extends to either side of that edge over casing face 60 far enough to have a border portion 66 between anvil face 13a and casing face 60 and over casing face 61 far enough to have a border portion 67 inserted between anvil face 13b and casing 61. Between those border portions, the strip 65 has a center portion 68. In like manner, every other strip on casing 27 extends far enough to either side of the edge covered thereby to have one border portion inserted on one side of the edge between an anvil face and a casing face, another border portion inserted on the other side of the edge between the anvil face and the casing face on the last named edge side and a center portion disposed between the two border portions. The purpose of those border and center portions of the strips will be later explained.

In the operation of the described apparatus, as the anvils are simultaneously driven inwardly on the work assembly 25 the pressure applied to the rear faces of the anvils is multiplied therein and is then exerted by the front faces of the anvils on the work assembly. Under this multiplied pressure, the pressure-transmissive material of casing 27 communicates such pressure more or less hydrostatistically to the central body 26 while, simultaneously, such material begins to bulge into the inter-anvil gaps from the edge and vertex region of the casing, i.e.—from underneath the strips of flexible stretchable material which cover the casing.

Referring to FIG. 4 one of such initials bulges 70 of pressure-transmissive material is shown in the gap 21a which lies between the anvils 10a and 10b. As earlier discussed, because the pressure-transmissive material in initial bulge 70 is not directly beneath the anvil faces 13a, 13b and, moreover, is not initially subjected to substantial pressure by the anvils 10a, 10b from the respective sides 71a, 71b of those anvils which border gap 21a, during the beginning part of the inward movement of the anvils, the bulge material has not become plastic enough so that, unaided, it will cohere well with itself and with the main body of casing 27. Thus, in the absence of the covering strip 65 of flexible stretchable material, the pressure-transmissive material in bulge 70 would detach itself from the casing and would be useless for gasket forming purposes. In the present instance, however, such detaching of the bulge material from the rest of the casing is inhibited by the covering strip 65 in a manner as follows. As shown, the border portions 66 and 67 of strip 65 are anchored in place by being pinched between the main body of the casing 27 and, respectively, the anvil faces 13a and 13b. The center portion 68 belonging to strip 65 and extending across gap 21a is, on the other hand, free to stretch into gap 21a in response to the bulging from underneath that center portion of the casing material. Hence, during the initial part of the anvil movement when the bulge material would otherwise detach itself from the rest of the casing, the strip 65 forms across gap 21a an anchored flexible stretchable diaphragm which restrains the bulge material from permanently detaching from the main body of the casing.

As the inward moving of the anvils continues, more pressure-transmissive material is extruded in the gap 21a to enlarge the bulge 70 and to cause further stretching of the diaphragm provided by strip 65. Eventually, the bulge reaches a size (represented by dotted line 72) at which the diaphragm can stretch no farther and will rupture. By this time, however, the diaphragm has done its work by restraining the bulge material long enough to have become plastic and coherent under the pressure exerted by the anvil sides 71a and 71b and, accordingly, to have formed in the gap 21a an effective gasket firmly attached to the main body of the casing.

In a manner alike to that of strip 65, each of the other covering strips on casing 27 provides during a compressing action an anchored flexible stretchable diaphragm which restrains the casing material bulging from underneath the strip for a period long enough to prevent the permanent detachment of such material from the rest of the casing prior to the formation by that material of an effective gasket. Inasmuch as the extruded material is held in at the vertex regions of the casing (by the corner caps) as well as at the edge regions of the casing (by the covering strips), there is no alienation from the casing of pressure-transmissive material extruded from any part thereof. Accordingly, the tapered front end of each anvil will be gasketed entirely around.

Because the flexible stretchable covering material prevents the permanent detachment of extruded pressure-transmissive material, from the rest of the casing, effective gaskets will be formed in the intergaps when those gaps are substantially wider than they would be at the time such gaskets would first be formed in the absence of such covering material. As earlier explained, the formation of gaskets in such wider gaps and the consequent greater thickness of those gaskets is advantageous because a greater fraction of the total anvil-exerted load will be transferred to the central body 26 of the work assembly 25.

Another factor causing transfer of a greater fraction of the total anvil-exerted load to the central body 26 is that the use of the described diaphragms causes the gaskets which form to have a smaller radial extent in the gaps than if such diaphragms were not used. It is known that a gasket of such smaller radial extent will absorb less of the total anvil load so as to permit more of such load to be transferred through the main body of casing 27 to the central body 26.

The described diaphragms are useful in creating gaskets of greater thickness and smaller radial extent in those instances where the size of the work assembly and the size of the matching anvil array are small enough to permit the eventual formation of smaller and thinner gaskets to take place even in the absence of such diaphragms. In addition, however, the described diaphragms are useful in that they make possible the use with given size anvils of a work assembly of a size which has hitherto been impractical. To wit, by the old practice which did not employ diaphragms, a work assembly of large size relative to that of the anvils employed therewith could not be used because the inter-anvil gaps would be so great that effective gaskets could not dynamically form in those gaps prior to the stopping of the anvils in their inward movement. When, however, the described diaphragms are employed, the maximum gap width at which gaskets will form in the inter-anvil gaps is substantially increased to thereby make practical the use with given size anvils of much larger work assemblies than could be used before. Thus, for example, it has been found possible by the use of the mentioned diaphragms to increase from 1.9 inches to 2.5 inches the length per side of a cubic work assembly employed in a particular pressure-multiplying apparatus.

The above described embodiment being exemplary only, it is to be understood that additions thereto, omissions therefrom and modifications thereof can be made without departing from the spirit of the invention, and that the invention comprehends embodiments differing in form and/or detail from that specifically described. Accordingly, the invention is not to be limited save as is consonant with the recitals of the following claims.

We claim:

1. A work in the form of an assembly adapted to be compressed by a plurality of pressure multiplying anvils operably arrayed around said assembly so as to be separated by inter-anvil gaps and so as to form around said assembly by the front faces thereof an enclosure interrupted by said gaps, said assembly comprising, a body of material to be compressed, a casing around said body of pressure-transmissive material different from that of said body and in which said body is embedded, said casing material being a matrix for said body and being changeable by applied pressure from implastic to plastic, flowable and extrudable, said casing having first surface areas operably contacted by said anvil faces and second surface areas operably registering with said gaps and each disposed between and in contiguous relation with a plurality of said first areas, and flexible stretchable sheet material disposed on said casing over said second areas and over portions of said first areas which border opposite sides of said second areas, said sheet material being adapted to be pinched at said bordering portions between said anvils and said casing so as to provide flexible stretchable restraining diaphragms across said gaps for casing material bulging outwardly from said second areas.

2. A work in the form of an assembly adapted to be compressed by a plurality of pressure multiplying anvils separated by inter-anvil gaps, said assembly comprising, a body of material to be compressed, a casing around said body of pressure-transmissive material different from that of said body and in which said body is embedded, said casing material being a matrix for said body and being changeable by applied pressure from implastic to plastic, flowable and extrudable, the exterior of said casing being formed of surfaces intersecting at edges from the regions of which said casing material is operably extruded, and flexible stretchable sheet material disposed on the exterior of said casing to cover said edges and to extend to either side of said edges at least part way over said surfaces so as to operably form flexible stretchable restraining diaphragms for casing material bulging outwardly from said regions.

3. A work in the form of an assembly adapted to be compressed by a plurality of pressure multiplying anvils operably arrayed around said assembly so as to be separated by inter-anvil gaps and so as to form around said assembly an enclosure having open edge regions produced by said gaps, said assembly comprising, a body of material to be compressed, a casing around said body of pressure-transmissive material different from that of said body and in which said body is embedded, said casing material being a matrix for said body and being changeable by applied pressure from implastic to plastic flowable and extrudable, said casing having an exterior matching enclosure in shape and characterized by surface areas operably contacted by said anvils and by edge regions operably registering with said gaps and each disposed between and in contiguous relation with a plurality of said surfaces, and flexible stretchable sheet material disposed on said casing over said regions and over portions of said surface areas which border opposite sides of said regions, said sheet material being operably adapted to be pinched at said bordering portions between said anvils and said casing so as to provide flexible stretchable restraining diaphragms across said gaps for casing material bulging outwardly from said edge regions.

4. A work in the form of an assembly adapted to be compressed by a plurality of pressure multiplying anvils operably arrayed around said assembly so as to be separated by inter-anvil gaps and so as to form around said assembly a polyhedral enclosure having open edge and vertex regions produced by said gaps, said assembly comprising, a body of material to be compressed, a casing around said body of pressure-transmissive material different from that of said body and in which said body is embedded, said casing material being a matrix for said body and being changeable by applied pressure from implastic to plastic, flowable and extrudable, said casing having a polyhedral exterior of which the shape matches that of said enclosure, and which has face areas operably contacted by said anvil faces and edge and vertex regions operably registering with said gaps and each disposed between and in contiguous relation with a plurality of said face areas, and flexible stretchable sheet material disposed on said casing over said regions and over portions of said face areas bordering opposite sides of said regions, said sheet material being operably adapted to be pinched at said bordering portions between said anvils and said casing so as to provide flexible stretchable restraining diaphragms across said gaps for casing material bulging outwardly from said regions.

5. A work in the form of an assembly adapted to be compressed by a plurality of pressure multiplying anvils separated by inter-anvil gaps, said assembly comprising, a body of material to be compressed, a casing around said body of pressure-transmissive material different from that of said body and in which said body is embedded, said casing material being a matrix for said body and being changeable by applied pressure from implastic to plastic, flowable and extrudable, and flexible stretchable sheet material disposed on said casing to cover elongated surface portions thereof which intersect each other to define on the casing exterior a closed grid work of cage shape, said surface portions being ones which will operably extend between and beyond the opposite sides of said gaps.

6. The method for improving gasket formation in apparatus wherein an array of pressure multiplying anvils are separated by inter-anvil gaps and are arrayed around a work assembly comprised of a body of material to be compressed and of a casing of a pressure-transmissive material around said body, said anvils operably pressing on said casing so as to communicate pressure through said casing to said body and so as to produce an accompanying extrusion of casing material into said gaps to there form gaskets sealing in said pressure so communicated, said method comprising, interposed flexible stretchable sheet material between said anvils and casing so as to form across each gap a flexible stretchable diaphragm which is operably held in place by being pinched at edges thereof on opposite sides of said gap between said casing and the anvils on said opposite gap sides, and which is thereupon adapted to restrain separation from said casing of casing material bulging outwardly from underneath said diaphragm.

References Cited in the file of this patent

UNITED STATES PATENTS

| | | |
|---|---|---|
| 2,406,361 | Fairbanks | Aug. 27, 1946 |
| 2,705,557 | Hartman | Apr. 5, 1955 |
| 2,941,241 | Strong | June 21, 1960 |
| 2,941,250 | Hall | June 21, 1960 |
| 2,995,776 | Giardine et al. | Aug. 15, 1961 |
| 3,061,877 | Custers et al. | Nov. 6, 1962 |
| 3,082,477 | Custers et al. | Jan. 26, 1963 |

FOREIGN PATENTS

| | | |
|---|---|---|
| 243,651 | Italy | Feb. 10, 1926 |